United States Patent
Sawai et al.

(10) Patent No.: US 6,772,235 B2
(45) Date of Patent: Aug. 3, 2004

(54) CONTROL APPARATUS FOR SEQUENCE CONTROL OF A DIE CASTING MACHINE

(75) Inventors: Norihiko Sawai, Saitama (JP); Toshinori Nakamoto, Kanagawa (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 333 days.

(21) Appl. No.: 09/793,122

(22) Filed: Feb. 27, 2001

(65) Prior Publication Data

US 2001/0054117 A1 Dec. 20, 2001

(30) Foreign Application Priority Data

Feb. 28, 2000 (JP) ........................................ 2000-056016

(51) Int. Cl.[7] .......................... G06F 3/00; G06F 13/12; G06F 13/38; G05B 11/01; G05B 15/18
(52) U.S. Cl. .............................. 710/18; 710/1; 710/15; 710/19; 710/62; 710/73; 710/305; 700/1; 700/7; 700/19; 700/20; 700/23
(58) Field of Search ............................... 710/62, 72, 9, 710/38, 240, 305, 1, 5, 8, 15, 18, 19, 63, 64, 100, 104; 700/1, 3, 4, 7, 19, 20, 23

(56) References Cited

U.S. PATENT DOCUMENTS

| | | | | |
|---|---|---|---|---|
| 4,862,353 A | * | 8/1989 | Williams | 710/62 |
| 4,992,926 A | * | 2/1991 | Janke et al. | 709/225 |
| 5,371,859 A | * | 12/1994 | Lennartsson | 710/114 |
| 5,408,129 A | * | 4/1995 | Farmwald et al. | 257/692 |
| 5,539,390 A | * | 7/1996 | Nagano et al. | 340/825.52 |
| 5,748,466 A | * | 5/1998 | McGivern et al. | 700/17 |
| 5,778,254 A | * | 7/1998 | Ohtsuka et al. | 710/38 |
| 5,872,940 A | * | 2/1999 | Circello et al. | 710/305 |
| 5,987,532 A | * | 11/1999 | Tokui | 710/9 |
| 6,101,570 A | * | 8/2000 | Neumyer | 710/240 |
| 6,218,954 B1 | * | 4/2001 | Ohuchi et al. | 340/3.1 |
| 6,546,441 B1 | * | 4/2003 | Lum | 710/72 |

FOREIGN PATENT DOCUMENTS

JP          8-95885       *   4/1996   ........... G06F/13/00

\* cited by examiner

Primary Examiner—Jeffrey Gaffin
Assistant Examiner—Tanh Nguyen
(74) Attorney, Agent, or Firm—Pillsbury Winthrop LLP

(57) ABSTRACT

A data input/output apparatus capable of decreasing a number of wires between a sequence controller and a control panel and not requiring a change of the number of the wires even if the number of input/output points of data is increased, provided with switches and light emitting diodes, a plurality of wires which can be directly connected to buses for transmission of data between an I/O unit and a CPU, a plurality of electronic switches connected to the buses by wires, outputting signals in accordance with levels of signals from the buses to the light emitting diodes based on input of a selection signal or outputting signals in accordance with levels of signals input from the switches to the buses, and address decoders connected to the buses by the wires and outputting selection signals to the corresponding electronic switches in accordance with a request from the CPU.

2 Claims, 5 Drawing Sheets

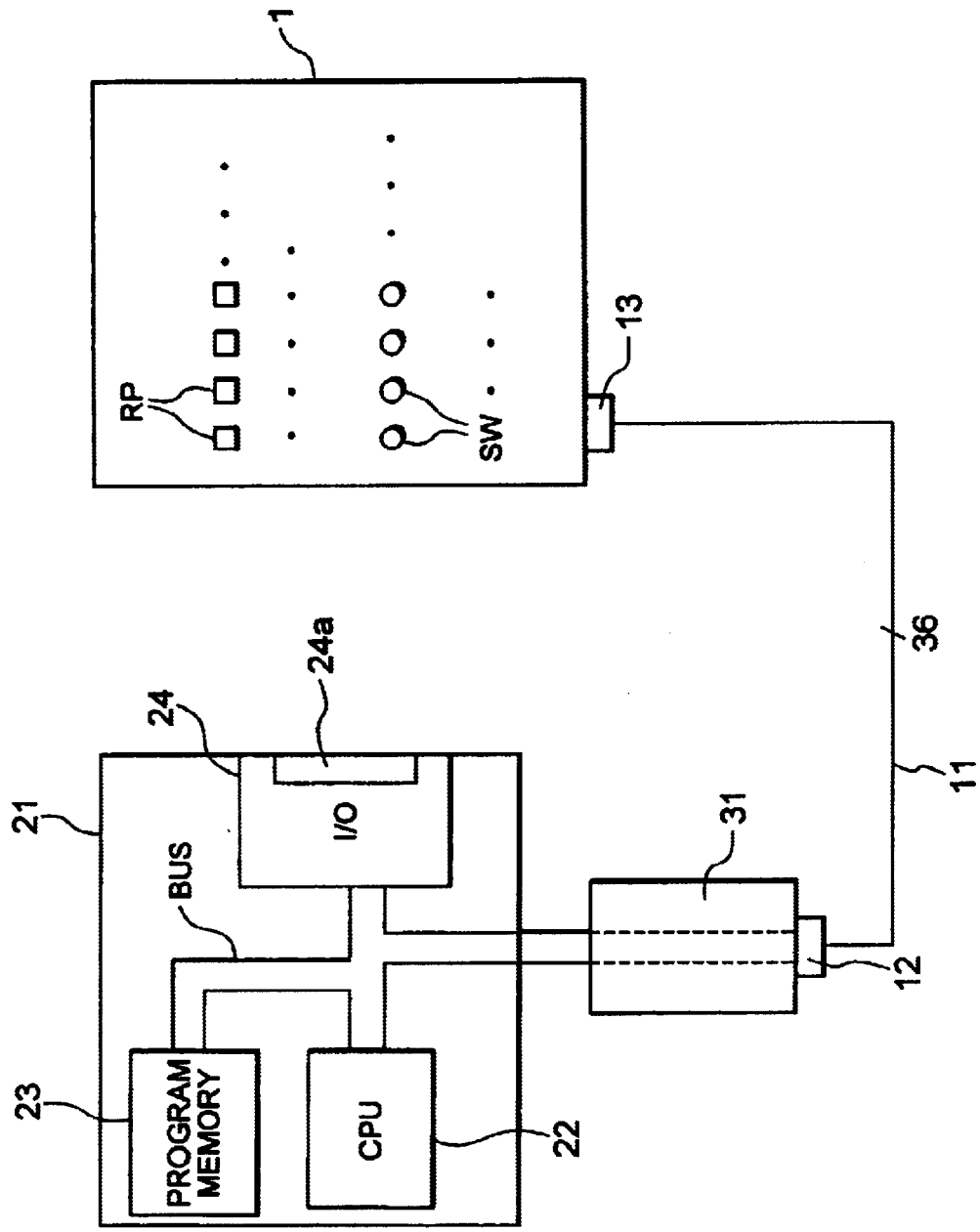

CONTROL APPARATUS FOR SEQUENCE CONTROL OF A DIE CASTING MACHINE

BACKGROUND OF THE INVENTION

1. Field of the Invention

The present invention relates to a data input/output apparatus for the input/output of data with a sequence controller and a control apparatus of a die casting machine using the same.

2. Description of the Related Art

A sequence controller sequentially controls an external apparatus according to a sequence program prepared in advance. This sequence controller is provided with an input/output unit for transferring signals with the external apparatus.

The input/output unit is provided with a predetermined number of terminals. For example, input terminals are electrically connected to input apparatuses such as switches, while output terminals are electrically connected to output apparatuses such as lamps or light emitting diodes (LED).

The sequence controller processes data comprised of level signals input from the input apparatus by a processor built in the sequence controller or outputs the data processed at the processor as level signals to the output apparatus.

Also, the sequence controller is used as a control apparatus of an automatically controlled machine, for example, a die casting machine or an numerical controlled machine tool. Data is input and output with the sequence controller as the control apparatus by a control panel provided with switches and lamps.

The above sequence controller, however, is limited in the number of the input/output terminals of the input/output unit.

For this reason, when the number of the input apparatuses and/or output apparatuses to be connected is larger than the number of the input/output terminals of the input/output unit, usually extension input/output units are added to the sequence controller.

For example, as shown in FIG. 1, a sequence controller 101 is provided with a processor 102, a program memory 103, and an input/output unit 104. These processor 102, program memory 103, and input/output unit 104 are connected by buses.

The extension input/output units 105 and 106 are mounted in for example slots provided in the sequence controller 101 and directly connected to the buses.

A control panel 130 is provided with switches SW and lamps RP. These switches SW and lamps RP are electrically connected to input/output terminals 104a, 105a, and 106a of the input/output unit 104 and extension input/output units 105 and 106 by wires 120, 121, and 122.

When the sequence controller 101 and the control panel 130 are connected by using the extension input/output units 105 and 106 as described above, the amount of wires becomes three times the case where only the input/output unit 104 is connected to the control panel 130.

Also, when the switches SW and the lamps RP are increased, the number of the wires is increased accordingly. When the wires are increased, there are the disadvantages that a large space is taken up by the wires, the apparatus becomes large, and the cost rises.

Particularly, in a die casting machine, it is necessary to control the injection to fill a molten metal into the cavity of the die, control clamping for clamping the dies, and control apparatuses attached to the die casting machine such as a spray apparatus, conveyance apparatus, etc. In order to control these according to predetermined procedures, large number of various sensors are necessary. It is necessary to input detection signals of these sensors to the sequence controller or output them through the sequence controller to the control panel.

Accordingly, in a die casting machine as well, the number of the input/output signals of the sequence controller is very large, so the number of wires between the sequence controller 101 and the control panel 130 is increased.

In a die casting machine, molten metal is used. Therefore, the molten metal is scattered around the die casting machine creating a bad environment. For example, when the molten metal adhers to the wires for connecting the sequence controller and the control panel, there is a possibility of the wires breaking or of wires short-circuiting with each other. For this reason, the number of the wires for connecting the sequence controller and the control panel is preferably as small as possible.

SUMMARY OF THE INVENTION

An object of the present invention is to provide a data input/output apparatus capable of decreasing the number of wires with the sequence controller and not requiring a change of the number of the wires even if the number of the input/output points of the data is increased.

Another object of the present invention is to provide a control apparatus of a die casting machine with a decreased number of wires between the sequence controller and the control panel.

According to a first aspect of the present invention, there is provided A data input/output apparatus for the input/output of data with respect to a sequence controller provided with an input/output unit having a predetermined number of terminals for the input/output of data and a processing means for transferring data with the input/output unit and processing data, comprising a plurality of external input/output means for sending data to the sequence controller or receiving data from the sequence controller; a plurality of connecting wires electrically connected to buses for the transmission of data between the input/output unit and the processing means; a plurality of electronic switches electrically connected to the external input/output means, electrically and commonly connected to the connecting wires, and outputting signals responsive to levels of input signals to the external input/output means or the connecting wires in accordance with input of a selection signal; a selecting means electrically connected to the connecting wires and outputting the selection signal to the electronic switch connected to the external input/output means being selected by the processing means.

According to a second aspect of the present invention, there is provided a control apparatus for sequence control of a die casting machine for filling a molten metal in a die cavity and casting a product, comprising a machine controller for controlling the die casting machine; a sequence controller provided with an input/output unit having a predetermined number of terminals for the input/output of data and a processing means for transferring data with the input/output unit and processing data and processing the data and instructing the machine controller according to a sequence program predetermining procedures to be performed by the die casting machine; a plurality of connecting wires electrically connected to buses for the transmission of data between the input/output unit and the processing means; a plurality of external input/output means for sending data defining the operation of the die casting machine to the machine controller to the sequence controller or receiving data defining an operating state of the die casting machine from the sequence controller; a plurality of connecting wires electrically connected to the buses for the transmission of data between the input/output unit and the processing means; a plurality of electronic switches electrically connected to the external input/output means, electrically and commonly connected to the connecting wires, and outputting signals responsive to levels of input signals to the external input/output means or the connecting wires in accordance with input of a selection signal; a selecting means electrically connected to the connecting wires and outputting the selection signal to the electronic switch connected to the external input/output means being selected by the processing means.

In the present invention, when data is output from the sequence controller, the data is input through the buses and the connecting wires to the electronic switches.

Among the plurality of electronic switches, electronic switches selected by the processing means of the sequence controller output signals responsive to signal levels of the data input through the buses and the connecting wires to the external input/output means (control panel).

On the other hand, among the data input from the external input/output means, the data input to the electronic switches selected by the processing means output signals responsive to signal levels of the input data to the processing means of the sequence controller via the connecting wires and the buses.

In this way, in the present invention, the transfer of data between the sequence controller and the external input/output means is handled not through the input/output terminals of the input/output unit, but through the buses of the sequence controller. The data input from the external input/output means and the data output to the external input/output means are, however, handled in the same way as the data input to and output from the input/output terminals of the sequence controller.

Also, since a plurality of electronic switches are commonly connected to a limited number of wires, even if the number of the data input/output points of the external input/output means is increased, the number of the connecting wires connected to the buses will not be increased. Further, even when it is desired to increase the number of the data input/output points of the external input/output means, the number of the electronic switches may be increased. It is not necessary to increase the number of the connecting wires connected to the buses.

BRIEF DESCRIPTION OF THE DRAWINGS

These and other objects and features of the present invention will be more apparent from the following description of the preferred embodiments given with reference to the accompanying drawings, wherein:

FIG. 5 is a view of the configuration of a modification of the present invention.

DESCRIPTION OF THE PREFERRED EMBODIMENTS

Figure 1:
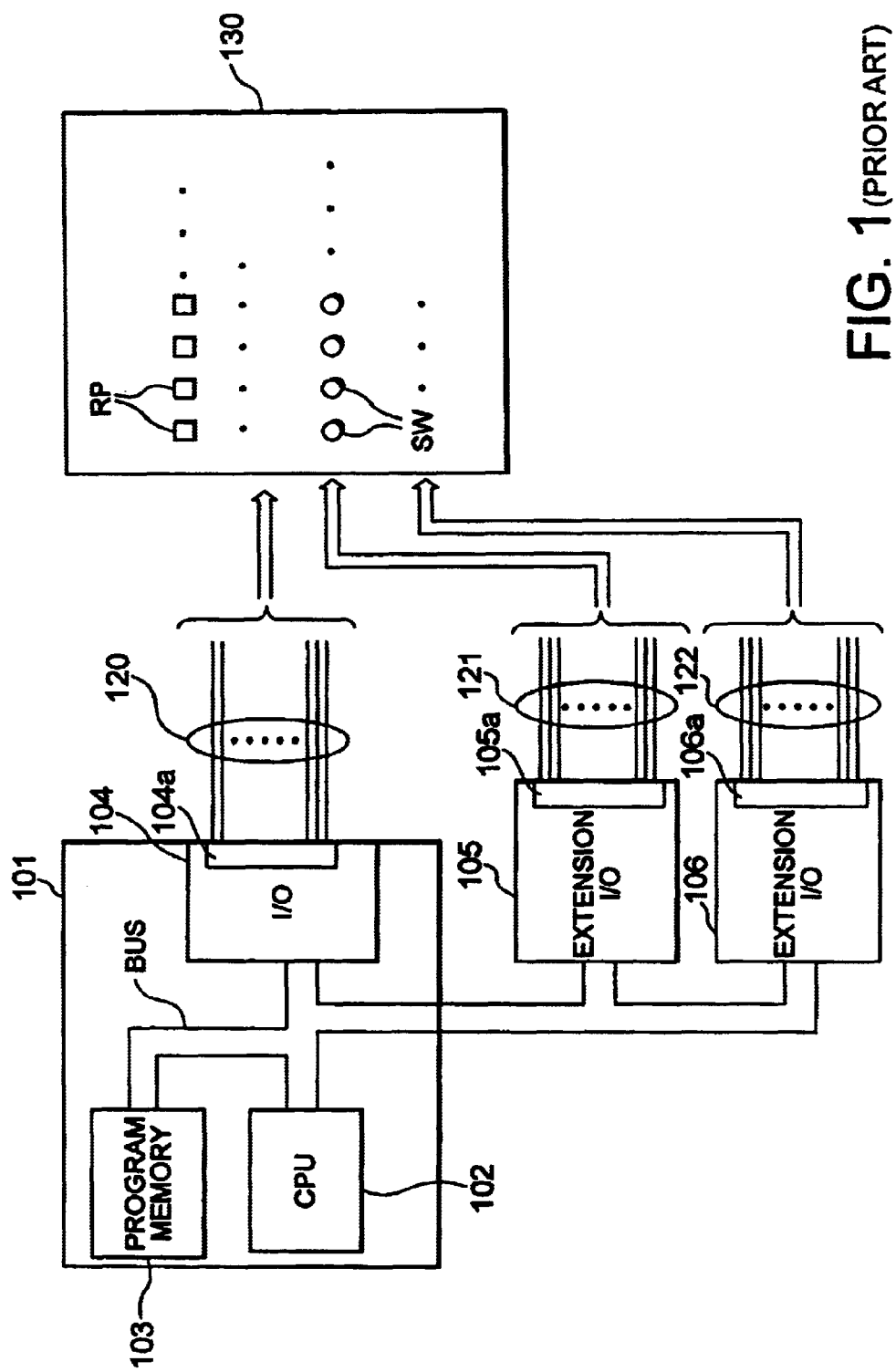
FIG. 1 is a view for explaining a conventional connection method of a sequence controller and a control panel.

Below, an explanation will be given of embodiments of the present invention by referring to the drawings.

Figure 2:
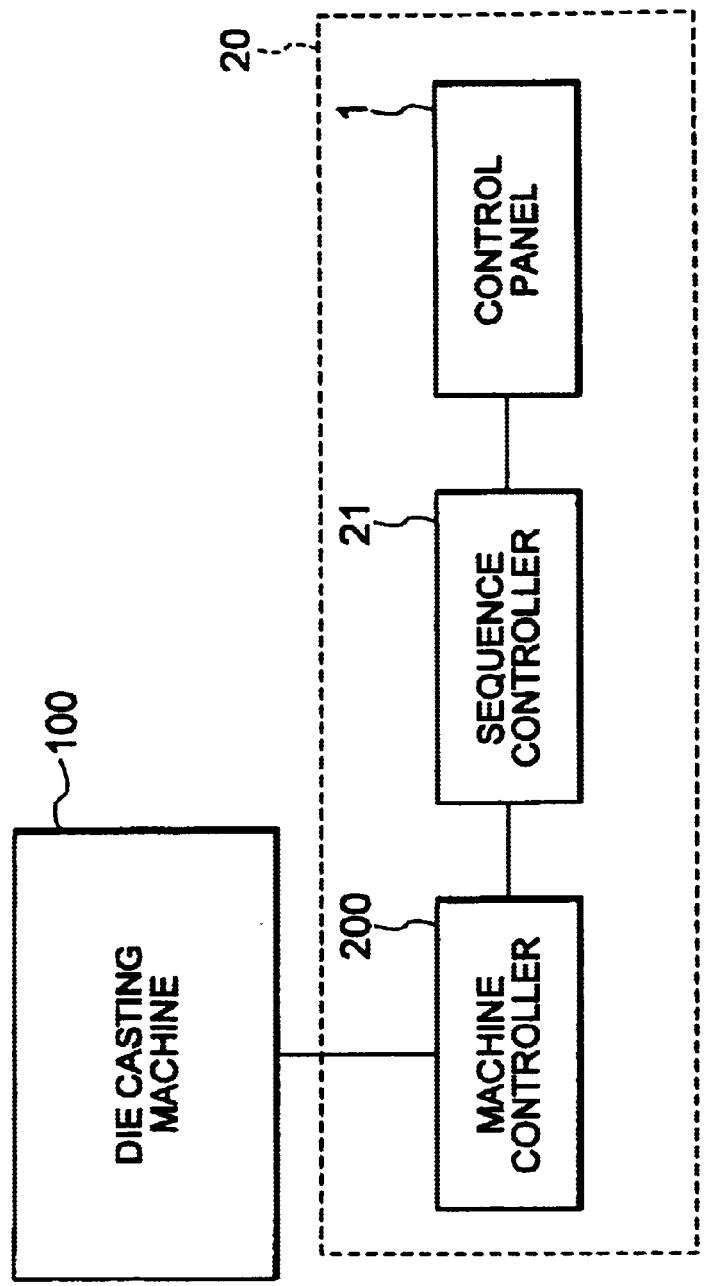
FIG. 2 is a view of the configuration of a control apparatus of a die casting machine according to an embodiment of the present invention.

FIG. 2 is a view of the configuration of an embodiment of a control apparatus of a die casting machine of the present invention.

As shown in FIG. 2, a control apparatus 20 of the die casting machine according to the present embodiment is provided with a machine controller 200 electrically connected to a die casting machine 100, a sequence controller 21, and a control panel 1.

The die casting machine 100 is provided with a pair of fixed die and movable die, a fixed die plate and a movable die plate for holding these fixed die and movable die, a die clamping apparatus for extending a tie bar and clamping the fixed die and the movable die, an injection apparatus for injecting molten metal into the cavities formed between the fixed die and the movable die, and a molten metal feeding apparatus for feeding the molten metal to the injection apparatus.

The machine controller 200 controls the operation of the die casting machine 100. Concretely, it controls the die clamping apparatus, injection apparatus, molten metal feeding apparatus, and so on.

The sequence controller 21 holds a sequence program defining the casting process of a die cast product by the die casting machine 100 and outputs instructions to the machine controller 200 according to this sequence program.

The control panel 1 is for inputting data defining the operation of the die casting machine 100 and displaying data defining the operating state of the die casting machine. Concretely, the control panel 1 gives for example signals for activating or stopping the die casting machine 100 to the sequence controller 21. Also, various process states such as an activation state, die clamping state, and injection completion state of the die casting machine 100 are input through the sequence controller 21 which then displays these states.

Figure 3:
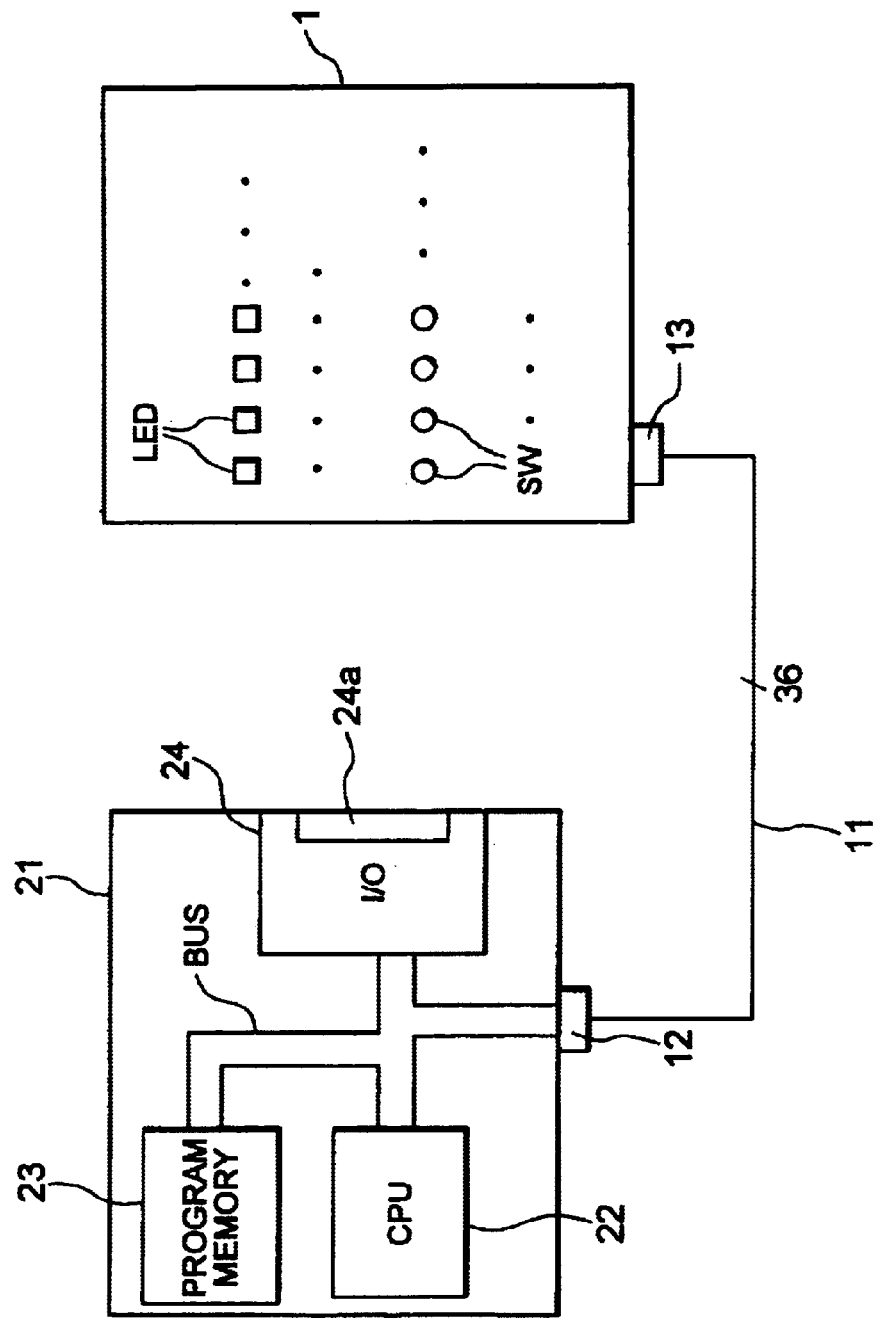
FIG. 3 is a view for explaining connections of a control panel with the sequence controller.

FIG. 3 is a view for explaining connections of the control panel 1 as the data input apparatus of the present invention with the sequence controller 21.

In FIG. 3, the sequence controller 21 is provided with a processor 22, a program memory 23, an input/output unit 24, and buses for connecting these processor 22, program memory 23, and input/output unit 24. Note that, the processor 22 corresponds to a concrete example of the processing means of the present invention.

The program memory 23 stores and holds various programs for the processing to be performed by the sequence controller 21. Concretely, it is the sequence program defining the operation to be performed by the die casting machine 100.

The processor 22 performs various data processing operations according to the program stored in the program memory 23.

Concretely, for example it processes the data to be output to the control panel 1 and outputs the same through the buses or processes the data input through the buses.

The input/output unit 24 is provided with a predetermined number of input/output terminals 24a for input/output of the data with an external apparatus, outputs data from an external apparatus input from this input/output terminal 24a via the buses to the processor 22, or outputs data input through the buses to the input/output unit 24 from the input/output terminal 24a.

The buses comprise a plurality of wires. These comprise a predetermined number of data lines for transmitting data and a predetermined number of address lines for transmitting address data. For example, there are 32 data lines in total including 16 data input lines and 16 data output lines and for example four address lines.

A housing of the control panel 1 is provided with a plurality of LEDs and switches SW. These may be visually confirmed by the operator or operated by the operator.

The LEDs and switches SW of this control panel 1 are electrically connected to the sequence controller 21. This electrical connection is by a connection cable 11. Note that the connection cable 11 corresponds to a concrete example of the connecting wires of the present invention.

The connection cable 11 is provided with connectors 12 and 13 at its two ends. These connectors 12 and 13 are provided with connection terminals corresponding to the plurality of connecting wires in the connection cable 11.

The number of the connecting wires in the connection cable 11 corresponds to the number of the buses, i.e., 36 in the above example. That is, the connection cable 11 is provided with 32 connecting wires for the data lines of the buses and four connecting wires for the address lines.

Figure 4:
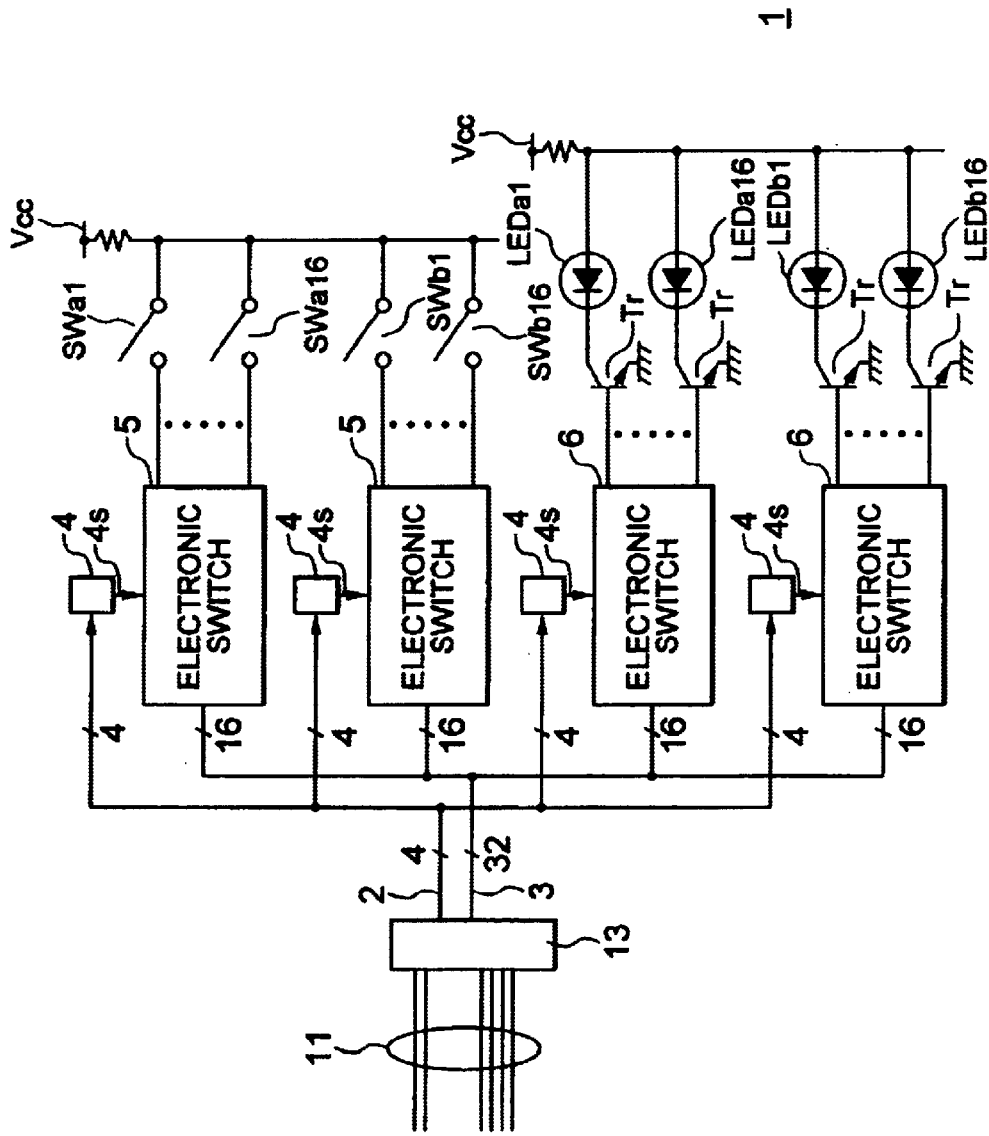
FIG. 4 is a view of the configuration of a data input/output apparatus according to an embodiment of the present invention.

FIG. 4 is a view of the configuration of a data input/output apparatus according to an embodiment of the present invention and shows the configuration of the control panel 1.

In FIG. 4, the control panel 1 is provided with switches SWa1 to SWa16 and SWb1 to SWb16, light emitting diodes LEDa1 to LEDa16 and LEDa1 to LEDa16, a plurality of electronic switches 5 and 6, and a plurality of address decoders 4.

Note that, the switches SWa1 to SWa16 and SWb1 to SWb16 correspond to a concrete example of the external data input/output means of the present invention for outputting data from the sequence controller 21, while the light emitting diodes LEDa1 to LEDa16 and LEDa1 to LEDa16 correspond to a concrete example of the external input/output means of the present invention for inputting the data to the sequence controller.

Also, the address decoder 4 corresponds to a concrete example of the selecting means of the present invention.

A plurality of electronic switches 5 exist. Sixteen connecting wires connected to the data buses for the data output among the connecting wires in the connection cable 11 are connected to the output points. Namely, these two electronic switches 5 are connected so as to share the connecting wires connected to the data input buses.

The electronic switches 5 and 6 are connected the one ends of the switches SWa1 to SWa16 and SWb1 to SWb16.

Note that, the other ends of the switches SWa1 to SWa16 and SWb1 to SWb16 are connected to a power supply Vcc via resistances.

Also, each electronic switch 5 is able to receive a selection signal 4s from the corresponding address decoder 4.

These electronic switches 5 output signals responsive to the levels of the signals input from the switches SWa1 to SWa16 and SWb1 to SWb16 to the corresponding data lines of the buses through the connection cable 11 in accordance with the input of the selection signal 4s.

Note that, the signals input from the switches SWa1 to SWa16 and SWb1 to SWb16 become a state of "High" when the switch SW is turned ON, while become a state of "Low" when the switch SW is turned OFF.

There are a plurality of electronic switches 6. Among the connecting wires built in the connection cable 11, 16 connecting wires connected to the data input data buses are connected to the input points. Namely, these two electronic switches 6 are connected so as to share the connecting wires connected to the data output buses.

On the other hand, the output points of the electronic switches 6 are connected to one ends of the light emitting diodes LEDa1 to LEDa16 and LEDa1 to LEDa16 via transistors Tr.

Note that, the other ends of the light emitting diodes LEDa1 to LEDa16 and LEDa1 to LEDa16 are connected to the power supply Vcc via the resistances.

Also, each electronic switch 6 is able to receive a selection signal 4s from the corresponding address decoder 4.

These electronic switches 6 output signals responsive to the levels of the input signals input from the buses of the sequence controller 21 to the transistors Tr in accordance with the input of the selection signal 4s. Namely, when the signal output from the electronic switch 6 is "High", the transistor Tr turns on, current flows through the corresponding light emitting diodes LED, and the light emitting diode LED emits light, while when the signal output from the electronic switch 6 is "Low", the transistor Tr turns off, the current of the corresponding light emitting diode LED is shut off, and the light emission is stopped.

The address decoders 4 are provided corresponding to the electronic switches 5 and 6. These address decoders 4 are commonly connected to address lines of the buses led out from the connector 13.

Each address decoder 4 has its own address seen from the processor 22 of the sequence controller 21. When the address data output from the processor 22 through the buses BUS matches with its own address, for example, it outputs the pulse-like selection signal 4s to the corresponding electronic switch 5 or 6.

Namely, the address decoders 4 output the selection signals 4s to the corresponding electronic switches 5 and 6 according to a request from the processor 22 of the sequence controller 21.

Next, an explanation will be given of the data input/output operation with the sequence controller 21 by the control panel 1 having the above configuration.

For example, when any one of the switches SWa1 to SWa16 and SWb1 to SWb16 of the control panel 1 is operated, the signal of "High" or "Low" is input from the operated switch SW to either electronic switch 5.

On the other hand, the processor 22 of the sequence controller 21 scans the output state of the electronic switch 5 at a constant period, that is, outputs address data of the address decoder 4 provided corresponding to the electronic switch 5 at a constant period.

For this reason, the address decoder 4 receiving a request from the processor 22 outputs the selection signal 4s to the corresponding electronic switch 5. The electronic switch 5 outputs the input level from the corresponding switch SW to the data line of the buses.

By this, the processor 22 of the sequence controller 21 acquires the data by the operation of the switches SWa1 to SWa16 and SWb1 to SWb16 of the control panel 1 and performs the predetermined processing to this data.

On the other hand, when it is desired to turn on or off a desired LED among the light emitting diodes LEDa1 to LEDa16 and LEDa1 to LEDa16 from the processor 22 of the sequence controller 21, the address data of the electronic switch 6 with the corresponding LED connected thereto and data indicating turning on or off ("High" or "Low") are output to the address lines of the buses and the corresponding data lines.

The address decoder 4 of the electronic switch 6 requested by the address data from the processor 22 of the sequence controller 21 outputs the selection signal 4s to the electronic switch 6.

The input points of the electronic switches 6 connected to the data lines with the data indicating the turning on or off output thereto receive the related data. When the selection signal 4s is input to the related electronic switch 6, a signal in accordance with the level turning on/turning off the data is output to the corresponding transistor Tr, and the corresponding LED emits light or turns off.

In this way, according to the present embodiment, the input/output of data between the data input/output apparatus and the sequence controller 21 can be directly carried out through the buses of the sequence controller 21 without use of the input/output unit 24 of the sequence controller 21. By transferring data originally carried out via the input/output unit 24 through the buses of the sequence controller 21, the number of the connecting wires of the connection cable 11 can be made the same as the number of the wires of the buses.

When data is input and output by using the input/output unit 24 of the sequence controller 21, there is no particular problem so far as the numbers of the switches SW and the LEDs of the control panel 1 are within the number of terminals of the input/output unit 24, but if the numbers of the switches SW and the LEDs are larger than the number of the input/output terminals 24a, it is necessary to add extension input/output units other than the input/output unit 24.

In the present embodiment, even if the numbers of the switches SW and the LEDs provided in the control panel 1 are larger than the number of terminals of the input/output unit 24, the number of the connecting wires of the connection cable 11 is the same as the number of the wires of the buses and as a result the number of the wires can be decreased.

Also, when the numbers of the switches SW and the LEDs provided in the control panel 1 are to be increased, this can be easily coped with by the addition of electronic switches 5 and 6 provided on the control panel 1 side.

The present invention is not limited to the above embodiments.

While the above embodiment was explained with reference to the switches and the light emitting diodes as the external input/output means, the present invention also can be applied to for example a various kind of sensors and motors as the external input/output means.

In the above embodiment, the configuration directly connecting the control panel 1 to the sequence controller 21 by a connection cable 11 was employed, but it is also possible to employ for example the configuration shown in FIG. 5.

Namely, as shown in FIG. 5, an extension input/output unit 31 is mounted in the sequence controller 21 and connected to the buses of the sequence controller 21.

A commercially available general sequence controller 21 is provided with slots for mounting extension input/output units 31. By mounting an extension input/output unit 31 in such a slot, the extension input/output unit 31 can be connected to the bus of the sequence controller 21.

Also, the commercially available extension input/output unit 31 is provided a terminal for taking the bus out to the outside. The connector 12 of the connection cable 11 is connected to this terminal. The sequence controller 21 and the control panel 1 are connected via the extension input/output unit 31.

By employing the connection method of the above configuration, the processor 22 of the sequence controller 21 can recognize the electronic switches 5 and 6 of the control panel 1 connected to the extension input/output unit 31 as further extension input/output units, so it becomes possible to apply the present invention to the commercially available sequence controller 21 without modifying the software etc. of the sequence controller 21.

According to the present invention, the number of the wires for connecting the sequence controller and the data input/output apparatus can be greatly decreased.

Also, according to the present invention, even if the number of data points for the input/output between the data input/output apparatus and the sequence controller is increased, it is not necessary to change the number of the wires for connecting the sequence controller and the data input/output apparatus.

Further, the number of the wires between the control panel and the sequence controller can be greatly decreased in the control apparatus of the die casting machine.

While the invention has been described with reference to specific embodiment chosen for purpose of illustration, it should be apparent that numerous modifications could be made thereto by those skilled in the art without departing from the basic concept and scope of the invention.

What is claimed is:

1. A control apparatus for sequence control of a die casting machine for filling a molten metal in a die cavity and casting a product, comprising:

a machine controller controlling said die casting machine;

a sequence controller provided with an input/output unit having a predetermined number of terminals for inputting/outputting data and a processing means transferring data with the input/output unit, processing data and instructing said machine controller according to a sequence program predetermining procedures to be performed by said die casting machine; and a control panel provided with a plurality of external input/output means inputting data defining an operation of said die casting machine or outputting data defining an operating state of said die casting machine;

wherein said control panel comprises:

a plurality of electronic switches, each electrically connected to said external input/output means, outputting signals responsive to levels of input signals in accordance with input of a corresponding selection signal;

an address decoder for outputting each said selection signal to each electronic switch as selected by said processing means;

a connection cable provided with a plurality of connecting wires electrically and commonly connected to said electronic switches and a plurality of connecting wires electrically and commonly connected to said address decoders; and a connector for connecting said connecting wires of said connection cable with data lines and address lines of busses between the input/output unit and the processing means.

2. A control apparatus for sequence control of a die casting machine, comprising:

a sequence controller provided with an input/output unit having a predetermined number of terminals for an input/output of data and a processing means transferring data with the input/output unit, processing data and outputting instruction data for controlling the die casting machine; and a control panel provided with a plurality of external input/output means inputting data defining an operation of said die casting machine or outputting data defining an operating state of said die casting machine;

wherein said control panel comprises:

a plurality of electronic switches, each electrically connected to said external input/output means, outputting signals responsive to levels of input signals in accordance with input of a corresponding selection signal;

an address decoder for outputting each said selection signal to each electronic switch as selected by said processing means;

a connection cable provided with a plurality of connecting wires electrically and commonly connected to said electronic switches and a plurality of connecting wires electrically and commonly connected to said address decoders; and a connector for connecting said connecting wires of said connection cable with data lines and address lines of busses between the input/output unit and the processing means.

* * * * *